United States Patent [19]

Lee et al.

[11] 4,251,579
[45] Feb. 17, 1981

[54] FIRE PROTECTION MEANS

[75] Inventors: Eric C. Lee, Saffron Walden; Peter H. Lynam, Linton; Laurence J. A. Theobald, North Wembley; Harold W. Wyeth, Fleet, all of England

[73] Assignee: Ciba-Geigy Corporation, Ardsley, N.Y.

[21] Appl. No.: 910,555

[22] Filed: May 30, 1978

[30] Foreign Application Priority Data

Jun. 3, 1977 [GB] United Kingdom ............... 23580/77

[51] Int. Cl.³ ............................................... B32B 3/12
[52] U.S. Cl. .......................................... 428/73; 169/26; 428/116; 428/117; 428/920; 428/921
[58] Field of Search ................. 428/73, 116, 117, 118, 428/911, 920, 921; 169/26, 57; 52/806; 156/197

[56] References Cited

U.S. PATENT DOCUMENTS

| | | | |
|---|---|---|---|
| 2,411,328 | 11/1946 | MacNab | 128/505 X |
| 2,477,852 | 8/1949 | Bacon | 428/116 |
| 2,815,795 | 12/1957 | Vanderpoel | 428/116 X |
| 3,132,695 | 5/1964 | Peltier | 428/11 X |
| 3,364,097 | 1/1968 | Dunnington | 428/117 |
| 3,365,897 | 1/1968 | Middleton et al. | 428/116 X |
| 3,649,426 | 3/1972 | Gates | 428/911 X |
| 3,654,996 | 4/1972 | Naglowsky | 428/117 X |
| 3,673,057 | 6/1972 | Fairbanks | 428/116 |
| 3,684,235 | 8/1972 | Schupbach | 428/117 X |
| 3,811,997 | 5/1974 | Yuan | 428/116 |
| 3,930,541 | 1/1976 | Bowman et al. | 169/62 |
| 3,963,846 | 6/1976 | Bourke | 428/116 X |

FOREIGN PATENT DOCUMENTS 2080837 11/1971 France .
2228917 12/1974 France .
1454493 11/1976 United Kingdom .................. 428/117

Primary Examiner—Henry F. Epstein
Attorney, Agent, or Firm—Harry Falber

[57] ABSTRACT

A fire protection means comprises a panel consisting of a honeycomb core, having in cells thereof a fire-extinguishing fluid, and of facing sheets bonded to each face of the core, the panel being arranged so that, in use, it is more rigidly enclosed on one side than the other. On entry of, or impact with, a projectile, the facing sheet on the less rigidly enclosed side of the panel peels away, or otherwise preferentially breaks up or away, consequent upon passage of the projectile and/or the ensuing hydraulic shock, so that the fire-extinguishing fluid is rapidly liberated from a large proportion of the area of the panel and substantially in the preferred direction to suppress or extinguish rapidly any fire caused by entry of the projectile.

17 Claims, 5 Drawing Figures

FIRE PROTECTION MEANS

BACKGROUND OF THE INVENTION

This invention relates to means for resisting, preventing, damping or quelling fire, or resisting or preventing the spread of fire, particularly in bays adjacent fuel tanks or tanks of other combustible substances. Such means may be provided in vehicles, especially military vehicles, including ships and aircraft, but also in static installations, and are hereinafter called "fire protection means".

Panels comprising a honeycomb core bonded on either side to facing sheets, cells of the core containing a fire-extinguishing fluid, which may be a gas, a liquid, or a particulate substance, have been described in British patent specification No. 1,454,493. Such panels are designed to release the fluid to suppress or extinguish any fire caused by entry of a projectile.

It is an object of this invention to provide panels, adapted to discharge and disperse fire-extinguishing fluid in a preferred direction for the more rapid suppression or extinguishing of a fire.

DETAILED DISCLOSURE

This invention provides fire protection means comprising a panel consisting of a honeycomb core, having in cells thereof a fire-extinguishing fluid, and of facing sheets bonded to each face of the core, the panel being arranged so that, in use, it is more rigidly enclosed on one side than on the other. On entry of, or impact with, a projectile, the facing sheet on the less rigidly enclosed side of the panel peels away, or otherwise preferentially breaks up or away, consequent upon passage of the projectile and/or the ensuing hydraulic shock, so that the fire-extinguishing fluid is rapidly liberated from a large proportion of the area of the panel and substantially in the preferred direction.

The panels may be curved or planar.

In one embodiment of the invention, one facing sheet is thinner than the other; the thinner sheet is, of course, that through which the fire-extinguishing fluid is to be primarily discharged. Thus, when the panel is attached to, or forms part of, a wall of a fuel tank adjacent a bay, the side on which the panel is less rigidly enclosed should face outwards, that is to say, away from the tank and toward the interior of the bay. In the event of a projectile penetrating the panel and striking the tank, the facing sheet on the less rigidly enclosed side of the panel peels or breaks away so that the fire-extinguishing fluid is discharged into the bay. In this case, it is the less rigidly enclosed side of the panel which is the more likely to receive the projectile first. When the panel is attached to, or forms part of, a fuselage, the side on which the panel is less rigidly enclosed should be arranged to face toward the interior of a bay into which fuel may leak, in which case, despite the fact that it is the more rigidly enclosed side of the panel which is the more likely to be struck first by the projectile, the less rigidly enclosed side facing sheet will still peel or break away preferentially. Typically, one facing sheet has a thickness of from 2 to 50%, and preferably from 4 to 15%, of that of the other facing sheet.

In another embodiment of the invention, one facing sheet is bonded to the honeycomb core more weakly than is the other facing sheet; typically, the peel strength of the bond between one facing sheet and the core is from 1 to 50%, and preferably from 1 to 20%, of that of the bond between the other facing sheet and the core. (Methods of measuring the peel strength, such as the climbing drum peel strength test, are well known to those skilled in the art of honeycomb core structures.)

One method of realising such an embodiment comprises bonding one facing sheet to one face of the core and bonding the other facing sheet to the other face of the core by an intrinsically weaker adhesive than that by which the first facing sheet is bonded to the first face of the core. Selection of adhesives of suitable relative bonding strength is a routine measure within the ability of those skilled in the adhesive bonding of honeycomb cores to facing panels. Where thermosetting adhesives are used, the necessary difference in bonding strength may be achieved in suitable cases by employing, in the bonding of the second facing sheet, conditions where bonding is less effective, usually, a lower temperature.

Another method of construction such an embodiment comprises bonding, by means of an adhesive, one facing sheet to one face and bonding the other facing sheet to the other face by means of the same adhesive, applying uniformly a thinner layer than that by which the first facing sheet is bonded to the first face of the core. Selection of the relative amounts of adhesive to be utilised on opposite faces of the core is likewise within the routine skill of the honeycomb core bonder.

A third, and preferred, method of realising such an embodiment comprises bonding one facing sheet to one face of the core in a random pattern, or, preferably, in a regular discontinuous pattern, so that not all of the cell edge lengths on that face of the core are bonded to the facing sheet, and bonding the other facing sheet to the other face of the core such that a higher proportion of the cell edge lengths on that face of the core is bonded to the second facing sheet. The proportion of cell edge lengths which are not bonded to the facing sheet on the face of the core may likewise be varied within wide limits, depending upon such factors as the method of bonding used, the natures of the facing sheets and the core material, and the cell size. Preferably, substantially all the cell edge lengths are bonded on one face of the core to one facing sheet while from 5 to 95%, particularly 15 to 80%, and especially from 40 to 75%, of the cell edge lengths on the other face of the core remain unbonded to the other facing sheet. To get a uniform effect over the whole panel the pattern of bonded areas is preferably regular. It is particularly convenient to bond the facing sheet to the core in a series of stripes which criss-cross the area of contact between the core and the sheet so that continuous stripes of adhered core are formed, leaving regular discrete areas of unadhered core.

In a third embodiment of the invention, the panel is bonded on one side only to a substantially rigid conforming surface, such as a bulkhead, so that the fire-extinguishing fluid is primarily discharged from the opposite side of the panel into the desired zone.

It will be understood that the various embodiments listed are not mutually exclusive; thus, for example, one facing sheet may be thinner than the other and may also have a lesser proportion of the cell edge lengths bonded to the core.

The verb "to bond" in its various forms is used herein to include, where the context permits, fixing by welding, brazing, or soldering, but fixing by means of adhesive is strongly preferred.

The adhesive may be applied by any conventional method, such as by roller, by spray, by printing, or a solid film of adhesive may be used. The adhesive may be applied to the facing sheets, or to the cell edges, or to both. For discontinuous bonding, a liquid adhesive may be applied, through a screen or mask by spraying or printing, or there can be used a solid film adhesive having discrete holes over the entire bonding surface. The adhesive may be a thermoplastics material, or preferably, a thermosetting resin, such as a polyepoxide, polyurethane, and phenolic resin, or a mixture of a thermosetting resin and a thermoplastics material.

Facing sheets used in the panels of this invention may be of a resin-impregnated fibre, such as glass, polyamide, or carbon fibre, but they are preferably metal, such as stainless steel or aluminium alloy, and preferably one facing sheet is a metal foil of at most 0.25 mm thick. To reduce the permeability of facing sheets, especially those of resin-impregnated fibres, to gaseous fire extinguishing fluids, they may be coated with, e.g., a liquid curable epoxide resin composition which is subsequently allowed or caused or cure, or they may be wrapped in a suitable plastics film, e.g., of poly(vinylidene chloride). The panel edges may be hermetically sealed by coating them with a mastic, such as a polysulphide rubber, or by wrapping them around with a plastics tape.

A particularly preferred form of the invention has, as one facing sheet, stainless steel foil, typically, bright hard rolled stainless steel, 0.01 to 0.125 mm thick, which is bonded to 40 to 75% of the cell edge lengths of the core and, as the other facing sheet, an aluminium alloy sheet 0.2 to 2 mm thick which is bonded to substantially all of the cell edge lengths. These thinner facing sheets have been found to peel from the point of impact of a projectile in a particularly advantageous manner, liberating the fire-extinguishing fluid from a wide area in a requisite brief period (of the order of one hundredth of a second).

Honeycomb cores in the new fire protection means perform the function of enabling projection of a fire-extinguishing powder as a dispersion of suitable depth and consistency. They may be of any conventional core material, metallic or non-metallic, but for reasons of flexibility and weight-saving, non-metallic cores are preferred, especially those of a woven or non-woven fibrous material. Cores of fibrous material may, if desired, be impregnated with a resin, but cores made from cellulosic or aromatic polyamide fibres in the form of papers which have not been so impregnated are particularly preferred.

The term "honeycomb core", as used in this specification, includes, but is not limited to, cores having square, sinusoidal, rectangular, reinforced hexagonal, cylindrical, or hexagonal cells. Cores having hexagonal cells are preferred.

Fire-extinguishing fluids used in the new fire protection means may be of any known suitable gas, liquid, or fluid powder fire-extinguishing agent. Suitable gases and liquids include nitrogen, carbon dioxide, bromotrifluoromethane, bromochlorodifluoromethane, bromomethane, and carbon tetrachloride. Suitable fluid powder fire-extinguishing agents are usually of particle size 10 to 20 $\mu$m and include potassium cryolite, potassium and sodium bicarbonates, ammonium phosphates, and potassium bicarbonate-urea products. These powders are usually blended with a dispersion or flow additive, such as micronised hydrophobic silica. When gaseous fire-extinguishing agents are employed, cell walls of the honeycomb core are preferably perforated: alternatively, or in addition, non-nodal walls may be notched.

This invention also provides a process for making a fire protection means which comprises (i) bonding a honeycomb core to a first facing sheet, (ii) placing a fire-extinguishing liquid or fluid powder in cells of the core, and (iii) bonding a second facing sheet to the other face of the honeycomb core to form a panel, wherein (a) one facing sheet is thinner than the other, preferably having from 2 to 50%, and especially from 4 to 15%, of the thickness of the other sheet; and/or (b) one facing sheet is bonded to the honeycomb more weakly than the other, preferably so that the peel strength of the bond between one facing sheet and the core is from 1 to 50%, and preferably from 1 to 20%, of that of the bond between the core and the other facing sheet; and/or (c) the panel is fixed on one side only to a substantially rigid conforming surface.

Bonding the second facing sheet to honeycomb core containing the fire-extinguishing liquid or fluid powder should, of course, be carried out at temperatures below which that liquid or powder decomposes or substantially evaporates.

This invention further provides a process for making a fire protection means which comprises (i) bonding a honeycomb core to a first facing sheet, (ii) bonding a second facing sheet to the other face of the honeycomb core to form a panel, the assembly so formed being provided with one or more valves, (iii) withdrawing or displacing air from the core through a said valve or valves, and (iv) admitting a gaseous fire-extinguishing agent to cells in the core through a said valve or valves, wherein (a) one facing sheet is thinner than the other, preferably having a thickness from 2 to 50%, and especially from 4 to 15%, of that of the other sheet; and/or (b) one facing sheet is bonded to the honeycomb core more weakly than the other, preferably so that the peel strength of the bond between one facing sheet and the core is from 1 to 50%, and preferably from 1 to 20%, of that of the bond between the core and the other facing sheet; and/or (c) the panel is fixed on one side only to a substantially rigid conforming surface.

Conveniently, the valve or valves are provided in edging strips of the assembly; these strips are advantageously of a more robust material than the facing sheet.

The following Examples and the accompanying drawings illustrate fire protection means in accordance with this invention.

In the drawings

EXAMPLE 1

This Example describes the preparation of a panel, one face of which is bonded to the core by means of a first adhesive applied discontinuously, the other face being bonded uniformly.

Figure 1:
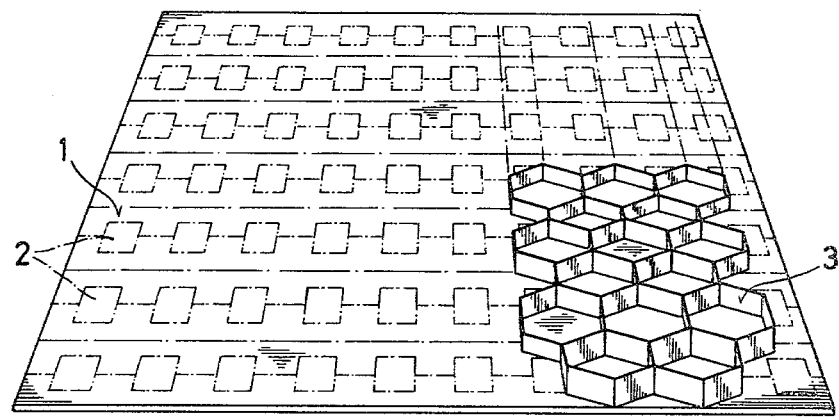
FIG. 1 shows a perspective view of a facing sheet partially coated with an adhesive and bearing a section of honeycomb core.
Figure 2:
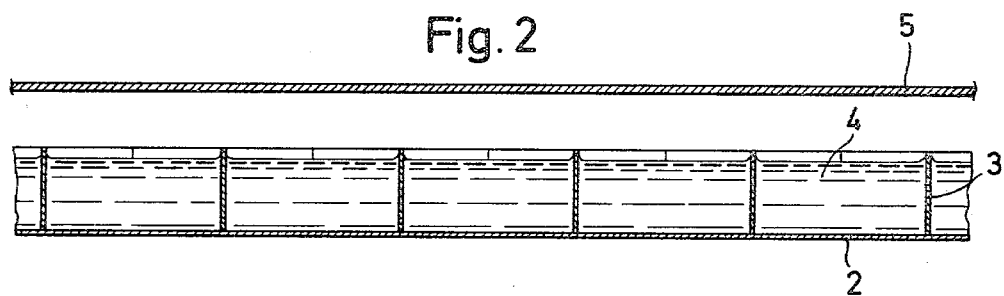
FIG. 2 shows a sectional view of a panel, the cells of the core containing a fire-extinguishing liquid, before the upper (thicker) facing sheet has been bonded to it.
Figure 3:
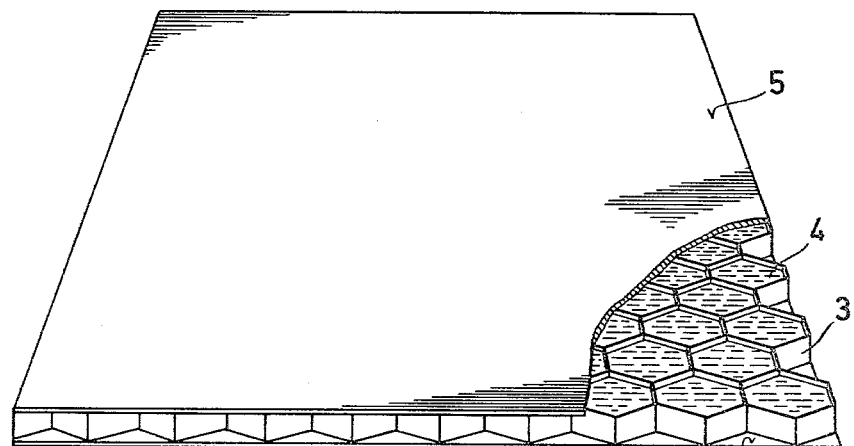
FIG. 3 shows a perspective view of a fire protection means, a portion of one facing sheet being cut away to show the core in place.

A commercially-available adhesive paste (1), comprising an epoxide resin, an aliphatic polyamine, and poly(vinyl chloride), was applied to a stainless steel foil 0.025 mm thick, leaving, as illustrated in FIG. 1, uncoated areas (2), 3.15×3.15 mm. Honeycomb core (3), 2.5 mm thick, composed of an aromatic polyamide paper with hexagonal cells of 6.35 mm (measured across the flats) was bonded to the foil by heating at 170° for 10–15 minutes under a pressure of 7 kN/m². A commercially available, fluid powder, fire-extinguishing agent (4), prepared from potassium bicarbonate and urea, was evenly distributed in the cells, in the proportion of 1.89 kg per sq. meter, as shown in FIG. 2. Then a commercially available, cold-curing liquid adhesive, containing an epoxide resin and an aliphatic amine-amine adduct, was applied uniformly to aluminium alloy foil (5), 0.31 mm thick, this coated foil was placed over the core, as shown in FIG. 3, and the assembly was bonded together by leaving it for 20 hours at room temperature under a pressure of 7 kN/m².

EXAMPLE 2

This Example describes the preparation of a panel which is to be mounted in use on a matching surface so that one side is more rigidly enclosed than the other.

Figure 4:
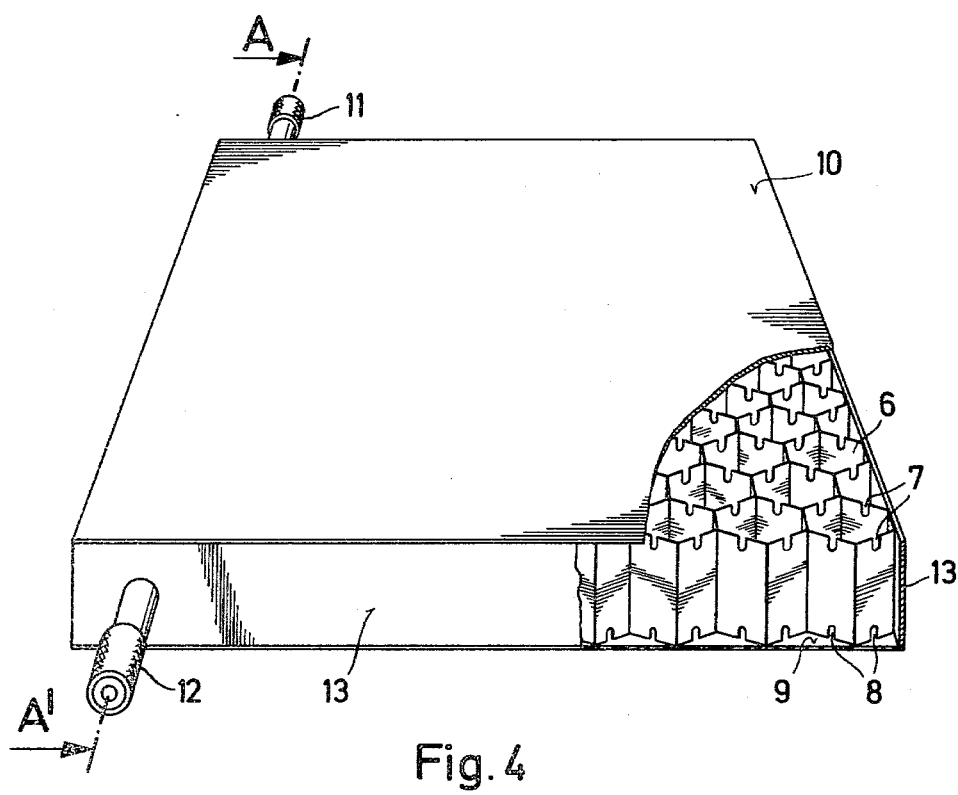
FIG. 4 shows a perspective view of a panel having edge members equipped with valves for the introduction of a gaseous fire-extinguishing agent and with notched cells, a portion of one facing sheet and two edge members being cut away to show the core in place.
Figure 5:
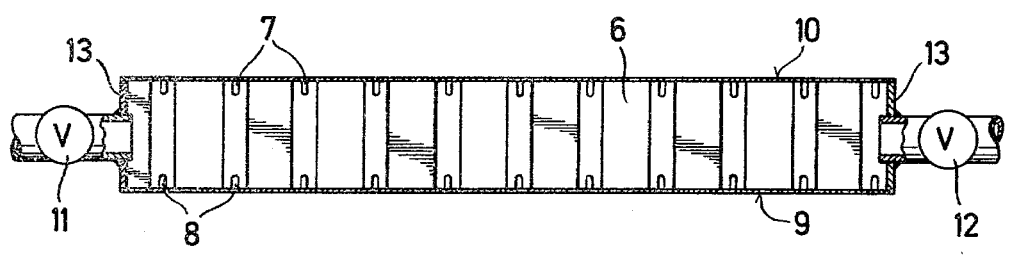
FIG. 5 shows a sectional view of the panel illustrated in FIG. 4, taken along the line AA'.

As shown in FIGS. 4 and 5, honeycomb core (6) 25 mm thick, made of a resin-impregnated aromatic polyamide paper with hexagonal cells of 19 mm (measured across the flats) was employed, the cells being notched from the top and bottom 3.2 mm deep as shown at 7 and 8 once on every face except that nodal faces. To each side of the core was bonded, by means of a commercially available, hot-curing adhesive film, aluminium alloy sheets (9 and 10) 0.102 mm thick. Motor vehicle pneumatic tire valves (11 and 12) were fitted to edge members (13) of aluminium alloy strip, air was pumped in until a pressure of 350 kN/m² was reached, and then the assembly was placed in water to detect any leakage of air. The absence of air bubbles showed that the panel was capable of containing a gaseous fire-extinguishing agent, even one under a considerable pressure.

For use of such a panel, air therein would be withdrawn or displaced, to be replaced by a suitable gaseous fire-extinguishing agent.

In another experiment, the aluminium alloy sheets were replaced by sheets of resin-impregnated glasscloth, which had wrapped around them a film of poly(vinylidene chloride) to prevent or suppress leakage of gaseous fire-extinguishant through the glasscloth.

What is claimed is:

1. In a fire protection means comprising a panel having a honeycomb core, having in cells thereof a fire-extinguishing fluid, and facing sheets bonded to each face of the core, the improvement enabling the fire-extinguishing fluid to be liberated in a desired direction upon actuation of the means by impact of a projectile and comprising the panel being so arranged that said honeycomb core is more rigidly enclosed on one face thereof than on the other.

2. The fire protection means of claim 1, wherein the facing sheet through which the fire extinguishing fluid is to be primarily discharged has a thickness of from 2 to 50% of that of the other facing sheet on the more rigidly enclosed side.

3. The fire protection means of claim 1, wherein the peel strength of the bond between one facing sheet and the core is from 1 to 50% of that of the bond between the other facing sheet and the core on the more rigidly enclosed side.

4. The fire protection means of claim 3, wherein one facing sheet is bonded to the core by an intrinsically weaker adhesive than that by which the other facing sheet is bonded to the core on the more rigidly enclosed side.

5. The fire protection means of claim 3, wherein the facing sheets are bonded to the core by means of thermosetting adhesive and one said facing sheet is bonded under conditions in which bonding is less effective than under those used to bond the other sheet on the more rigidly enclosed side.

6. The fire protection means of claim 3, wherein one facing sheet is bonded to one face of the core by means of an adhesive and the other facing sheet is bonded to the other face of the core by means of the same adhesive, applied uniformly as a thinner layer than that employed in bonded the first facing sheet to the first face of the core.

7. The fire protection means of claim 3, wherein the proportion of cell edge lengths on one face of the core which is bonded to one facing sheet on the more rigidly enclosed side is higher than that of the cell edge lengths on the other face of the core bonded to the other facing sheet.

8. The fire protection means of claim 7, wherein substantially all the cell edge lengths are bonded onto one face of the core and from 5 to 95% of the cell edge lengths on the other face of the core remain unbonded.

9. The fire protection means of claim 1, wherein the panel is bonded on one side only onto a substantially rigid conforming surface to form the more rigidly enclosed side.

10. The fire protection means of claim 1, wherein the facing sheets are of resin-impregnated fiber or of a metal.

11. The fire protection means of claim 10, wherein the facing sheet on the less rigidly enclosed side is a metal foil of at most 0.25 mm thick.

12. The fire protection means of claim 11, wherein one facing sheet is of bright hard rolled stainless steel foil 0.01 to 0.125 mm thick and bonded to 40 to 75% of the cell edge lengths of the core, and the other facing sheet is of aluminum alloy 0.2 to 2 mm thick and bonded to substantially all of the cell edge lengths of the core.

13. The fire protection means of claim 1, wherein the honeycomb core material is non-metallic.

14. The fire protection means of claim 1, wherein the honeycomb core material is of a woven or non-woven fibrous material.

15. The fire protection means of claim 1, wherein the fire extinguishing fluid is nitrogen, carbon dioxide, bromotrifluoromethane, bromochlorodifluoromethane, bromomethane, or carbon tetrachloride.

16. The fire protection means of claim 1, in which the fire-extinguishing fluid is a powder having a particle size of 10 to 20 μm.

17. The fire protection means of claim 16, in which the fire-extinguishing powder is potassium cryolite, potassium bicarbonate, sodium bicarbonate, an ammonium phosphate, or potassium bicarbonateurea.

* * * * *